(12) United States Patent
Palvoelgyi et al.

(10) Patent No.: US 9,937,653 B2
(45) Date of Patent: Apr. 10, 2018

(54) METHOD AND TOOL FOR PRODUCING A PRESSURE CONTAINER AND PRESSURE CONTAINER

(71) Applicant: MAGNA STEYR Fuel Systems GesmbH, Sinabelkirchen (AT)

(72) Inventors: Sandor Palvoelgyi, Gleisdorf (AT); Guenther Pozgainer, Graz (AT)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 124 days.

(21) Appl. No.: 14/921,254

(22) Filed: Oct. 23, 2015

(65) Prior Publication Data

US 2016/0114521 A1    Apr. 28, 2016

(30) Foreign Application Priority Data

Oct. 23, 2014 (EP) .................................. 14190062

(51) Int. Cl.
*B29C 49/20* (2006.01)
*F17C 1/00* (2006.01)
(Continued)

(52) U.S. Cl.
CPC .............. *B29C 49/20* (2013.01); *F17C 1/00* (2013.01); *F17C 1/06* (2013.01); *F17C 13/04* (2013.01); *B29C 49/04* (2013.01); *B29C 49/74* (2013.01); *B29C 2049/2008* (2013.01); *B29C 2049/2026* (2013.01); *B29C 2049/2043* (2013.01); *B29C 2049/2047* (2013.01); *B29C 2049/2078* (2013.01); *B29C 2049/4294* (2013.01); *B29K 2101/12* (2013.01); *B29K 2105/253* (2013.01); *B29K 2705/00* (2013.01); *B29L 2031/7156* (2013.01); *B29L 2031/7172* (2013.01); *F17C 2201/0109* (2013.01); *F17C 2201/056* (2013.01); *F17C 2203/0604* (2013.01); *F17C 2203/066* (2013.01); *F17C 2203/0614* (2013.01); *F17C 2203/0619* (2013.01); *F17C 2203/0636* (2013.01); *F17C 2205/0305* (2013.01); *F17C 2205/0323* (2013.01); *F17C 2209/219* (2013.01); *F17C 2209/2127* (2013.01); *F17C 2209/234* (2013.01); *F17C 2221/033* (2013.01);
(Continued)

(58) Field of Classification Search
None
See application file for complete search history.

(56) References Cited

U.S. PATENT DOCUMENTS

2011/0101002 A1    5/2011    Strack

FOREIGN PATENT DOCUMENTS

| CN | 1182385 A | 5/1998 |
|---|---|---|
| CN | 101858432 A | 10/2010 |

(Continued)

OTHER PUBLICATIONS

Office Action for Chinese Patent Application No. 2015106865615, dated Jun. 2, 2017, 9 pages including 5 pages of English translation.

*Primary Examiner* — Monica Huson
(74) *Attorney, Agent, or Firm* — Jordan IP Law, LLC; Todd A. Vaughn (57) ABSTRACT

A pressure vessel having an inner container made of thermoplastic plastic, and at least one metal part embedded in the inner container. A collar that includes the metal part is formed on the inner container, the collar being configured such that it is gas-tight with respect to the metal part.

10 Claims, 7 Drawing Sheets

(51) Int. Cl.
    *F17C 13/04*    (2006.01)
    *F17C 1/06*    (2006.01)
    *B29C 49/42*    (2006.01)
    *B29L 31/00*    (2006.01)
    *B29K 101/12*    (2006.01)
    *B29K 105/00*    (2006.01)
    *B29K 705/00*    (2006.01)
    *B29C 49/04*    (2006.01)
    *B29C 49/74*    (2006.01)

(52) U.S. Cl.
    CPC ................ *F17C 2223/0123* (2013.01); *F17C 2223/036* (2013.01); *F17C 2260/01* (2013.01); *F17C 2270/0168* (2013.01)

(56) References Cited

FOREIGN PATENT DOCUMENTS

| | | | |
|---|---|---|---|
| DE | 102006004121 A1 | 7/2007 |
| DE | 102010049838 A1 | 8/2011 |
| DE | 102011116553 A1 | 4/2013 |
| EP | 0323776 A1 | 7/1989 |
| EP | 0810081 A1 | 12/1997 |
| EP | 2236903 A1 | 10/2010 |
| WO | 2007/079971 A1 | 7/2007 |
| WO | 2014/014049 A1 | 1/2014 |
| WO | 2014/121935 A2 | 8/2014 |

METHOD AND TOOL FOR PRODUCING A PRESSURE CONTAINER AND PRESSURE CONTAINER

CROSS-REFERENCE TO RELATED APPLICATIONS

The present application claims priority 35 U.S.C. § 119 to European Patent Publication No. EP 14190062.1 (filed on Oct. 23, 2014), which is hereby incorporated by reference in its entirety.

TECHNICAL FIELD

Embodiments relate to a method for producing a pressure container or vessel, a tool for producing a pressure vessel by such a method, and a pressure vessel.

BACKGROUND

Pressure vessels are well known and are used, for instance, for the storage of Compressed Natural Gas (CNG) as fuel in motor vehicles. Pressure vessels of this type may include an inner container, also referred to as a "liner", which is wrapped with a fibre material. It is known to provide in the pressure vessel metal parts, which may serve, in particular, to receive fittings, such as valves, and are also referred to as a "boss". For the production of the inner container, the extrusion blow molding method, in which an extruded tubular preform is blow-molded, may for instance be used.

German Patent Publication No. DE 10 2011 116 553 A1, for example, discloses a method for producing a composite pressure vessel having an inner container made of thermoplastic plastic, at least one pole piece provided in a neck region, and having a winding, made of a fibre material, which reinforces the inner container, wherein the method comprises the production of the inner container by extrusion blow molding, wherein the pole piece, in the formation of the inner container, is molded onto the inner container, such that the pole piece is at least partially enclosed by the inner container. The pole piece is of two-part configuration and comprises a pole cap arranged outside the inner container, wherein the wall of the inner container is clamped in place in the neck region between the pole piece and the pole cap. Following completion of the inner container, the pole piece is secured from outside against the wall of the container with a locking element.

SUMMARY

Embodiments relate to a method for producing a pressure vessel, a tool for producing a pressure vessel by such a method, and a pressure vessel, so that a simple and cost-effective production of the pressure vessel is enabled.

In accordance with embodiments, a method for producing a pressure vessel comprising an inner container made of thermoplastic plastic, wherein the inner container is blow-molded from a preform in a tool and wherein at least one metal part, during the blow molding, is embedded in the inner container, wherein, in the blow molding, a collar comprising the metal part is formed on the inner container, the collar being formed in the blow molding such that it is gas-tight with respect to the metal part.

In accordance with embodiments, the inner container of the pressure vessel is blow-molded from a preform and, at the same time, a collar is shaped on the inner container, which collar surrounds the embedded metal part. With the aid of the projection, a gas-tightness may be created in a very simple manner between the metal part and the inner container. A subsequent method step and a complicated structure requiring, for instance, metal intermediate pieces or counter elements, may be avoided.

In accordance with embodiments, a method for producing a pressure vessel comprising an inner container made of thermoplastic plastic, the method comprising: blow-molding the inner container from a preform in a tool; and embedding, during the blow molding, at least one metal part in the inner container, wherein blow molding the inner container includes forming a collar, that includes the metal part, on the inner container so as to be gas-tight with respect to the metal part.

In accordance with embodiments, a pressure vessel, comprising: an inner container composed of thermoplastic plastic; at least one metal part embedded in the inner container; and a collar that includes the metal part formed on the inner container and which is gas-tight with respect to the metal part.

In accordance with embodiments, a tool for producing a pressure vessel, the tool comprising: an injector to inject a gas, the injector having a receptacle for at least one metal part of the pressure vessel; and mold halves which receive the at least one metal part to permit the at least one metal part to be inserted into a preform from which the inner container of the pressure vessel is formed, wherein the injector and the mold halves are configured such that by blow molding, by way of injection of gas through the injector and by closure of the mold halves, a collar that includes the at least one metal part, is formed on the preform, the collar being formed in the blow molding such that it is gas-tight with respect to the metal part.

In accordance with embodiments, the preform may be extruded and tubular.

Following the extrusion blow molding with embedded metal part, the inner container is usually wrapped with fibres.

In the blow molding, the collar is preferably sealed off from the metal part by a flexible sealing element, in particular a sealing ring, and/or by a sealing compound, in order to create the gas-tightness between the metal part and the collar.

In accordance with embodiments, the inner container, at the collar, is pinched off or separated off axially outside the seal against the metal part, so that a clean separation of the overhang of the preform from the inner container is enabled.

In accordance with embodiments, the metal part may be, in particular, a fitting receptacle, such as a valve receptacle, or a fastening part, wherein the fastening part may serve to fasten the pressure store, for example, in a vehicle.

In accordance with embodiments, both a fitting receptacle and a further metal part, such as a fastening part, may also be embedded in the inner container, preferably at opposite ends of the pressure store.

In accordance with embodiments, the metal part has a non-rotationally symmetric shape, so that, as a result of the embedment in the inner container, a positive-locking anti-twist device for the metal part is given.

In accordance with embodiments, the metal part has moldings, so that, as a result of the embedment in the inner container, a positive-locking axial displacement protection is given, in particular grooves, depressions or elevations.

In accordance with embodiments, the method may include fitting the metal part, prior to the blow molding, on an injector for the injection of air.

In accordance with embodiments, two metal parts may be applied on the same injector, which metal parts may be embedded in the inner container, in particular, at the two opposite end caps of the pressure vessel. The injector may be fitted on a machine slide, which enables the positioning of the injector with applied metal parts in the desired position within the preform and the removal of the finished pressure vessel from the mold region after the blow molding.

In accordance with embodiments, the metal part may be fitted onto an adapter which is rotatable and axially fixed on the injector. A further metal part may be mounted at one end of the injector.

In accordance with embodiments, a pressure vessel comprises an inner container made of thermoplastic plastic and at least one metal part embedded in the inner container, wherein a collar comprising the metal part is configured on the inner container, wherein the collar is configured such that it is gas-tight with respect to the metal part. The gas-tightness may be achieved, in particular, by a flexible sealing element and/or by a sealing compound.

The pressure vessel may have the further features previously described for the method. In particular, the metal part of the pressure vessel may be a fitting receptacle, in particular a valve receptacle, wherein the fitting receptacle may have an internal thread for screwing-in of a fitting. The fitting may be a valve or a device for gas extraction.

At mutually opposite ends of the inner container a metal part may respectively be embedded, wherein a collar comprising the respective metal part is respectively formed on the inner container, the collar being respectively configured such that it is gas-tight with respect to the respective metal part.

In accordance with embodiments, a tool to be used for producing a pressure vessel comprises an injector for the injection of air or another gas, and two mold halves, wherein the injector has a receptacle for the at least one metal part, wherein the metal part on the injector may be inserted into the preform and between the two mold halves, wherein the injector and the mold halves are configured such that by blow molding, by way of injection of gas through] the injector and by closure of the mold halves, a collar comprising the metal part is formed on the preform, the collar being formed in the blow molding such that it is gas-tight with respect to the metal part.

In accordance with embodiments, the tool may be configured such that a flexible sealing element and/or a sealing compound may be applied to an inserted metal part radially on the outside of the metal part.

In accordance with embodiments, the injector of the tool comprises a rotatable and axially fixed adapter configured to receive the metal part. The adapter may have an external thread so that the metal part, if it has a corresponding internal thread, may be screwed on. Between the injector and the adapter may be arranged a rotatable seal. The adapter may have a contact portion which is configured to be in sealing contact with a received metal part, in particular in order to form a metal-to-metal contact.

In accordance with embodiments, the tool comprises a drive, so that the adapter may be set in rotary motion by way of the drive.

The adapter may be configured as a hollow mold and radially surrounds the injector, which itself may be realized as an at least partially hollow shaft.

At one end of the injector may be configured a receptacle for a further metal part.

DRAWINGS

Embodiments will be illustrated by way of example in the drawings and explained in the description below.

DESCRIPTION

Figure 1:
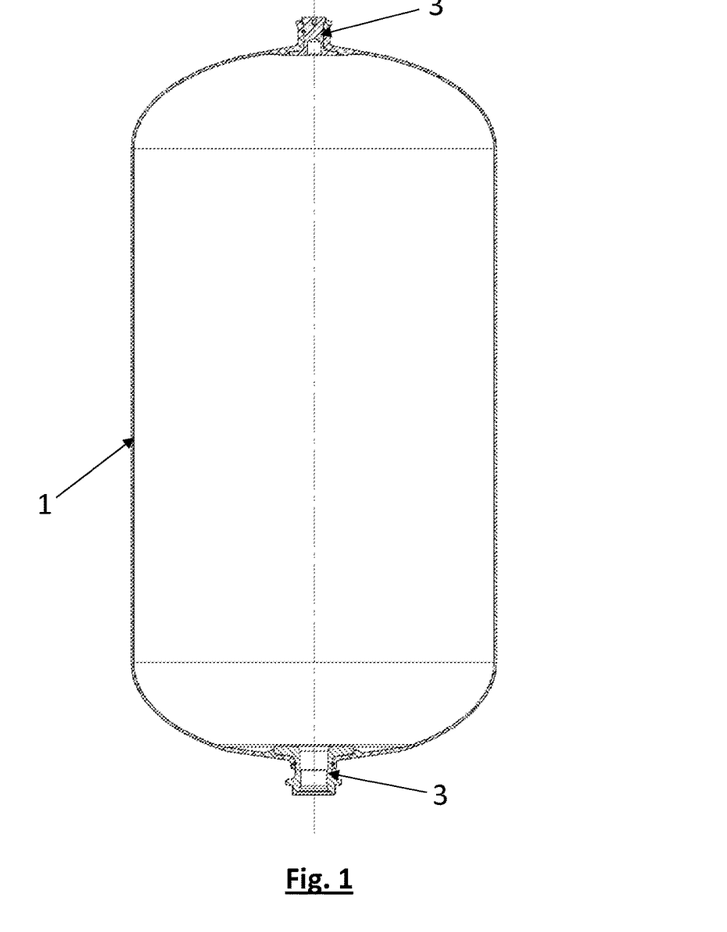
FIG. 1 illustrates a sectional view of an inner container of a pressure vessel, in accordance with embodiments.
Figure 2:
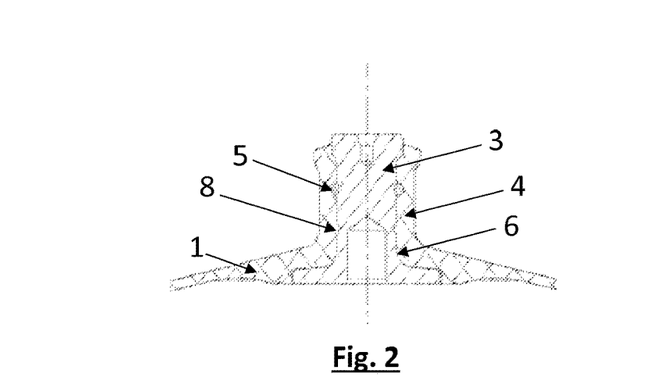
FIG. 2 illustrates a detailed representation of the metal part (end piece) represented at the top of FIG. 1.
Figure 3:
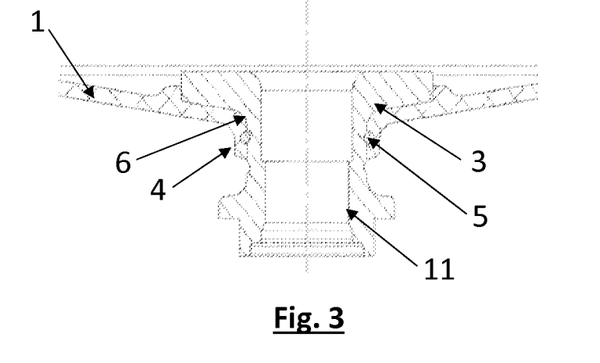
FIG. 3 illustrates a detailed representation of the metal part (valve receptacle) represented at the bottom of FIG. 1.

FIG. 1 is a sectional view of an inner container 1 of a pressure vessel in accordance with embodiments. FIGS. 2 and 3 illustrate the end regions of the inner container 1 in detail.

The inner container 1 is composed of thermoplastic plastic and has two embedded metal parts 3 on the end caps of the inner container 1. The metal part 3 represented at the top of FIG. 1 is an end piece, which, in the metal part 3 represented at the bottom of FIG. 1, is a valve receptacle.

In accordance with embodiments, the metal parts 3 are directly embedded in the extrusion-blow-molded inner container 1 (liner). For the sealing between the inner container 1 and the metal parts 3, respectively jointly embedded O-rings serve as sealing elements 5 and optionally, in addition, suitable sealing compounds 6 such as, for example, adhesives. For this purpose, collars 4, respectively comprising the metal parts 3, are configured on the inner container 1. The collars 4, by virtue of the sealing elements 5 and, where appropriate, sealing compounds 6, which are arranged thereat, are configured such that they are gas-tight with respect to the respective metal part 3.

As illustrated in FIG. 2, the metal part 3 has as at the molding 8 a circumferential groove, so that as a result of the embedment of the metal piece 3 in the inner container 1, a positive-locking axial displacement protection is provided.

As illustrated in FIG. 3, the metal part 3 is a valve receptacle, and therefore, has an internal thread 11 for screwing-in of a valve.

Figure 4:
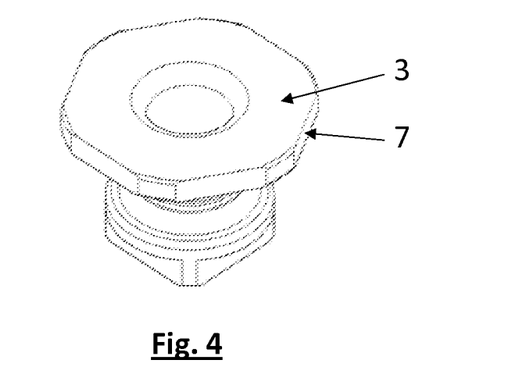
FIG. 4 illustrates a three-dimensional representation of the metal part of FIG. 3.

As illustrated in FIG. 4, a valve receptacle in three-dimensional view is provided, in which the flat sites give the metal part 3 a non-rotationally symmetric shape 7, so that, as a result of the embedment in the inner container 1, a positive-locking anti-twist device is given.

The method and the tool for producing the inner container is provided hereinbelow.

Figure 5:
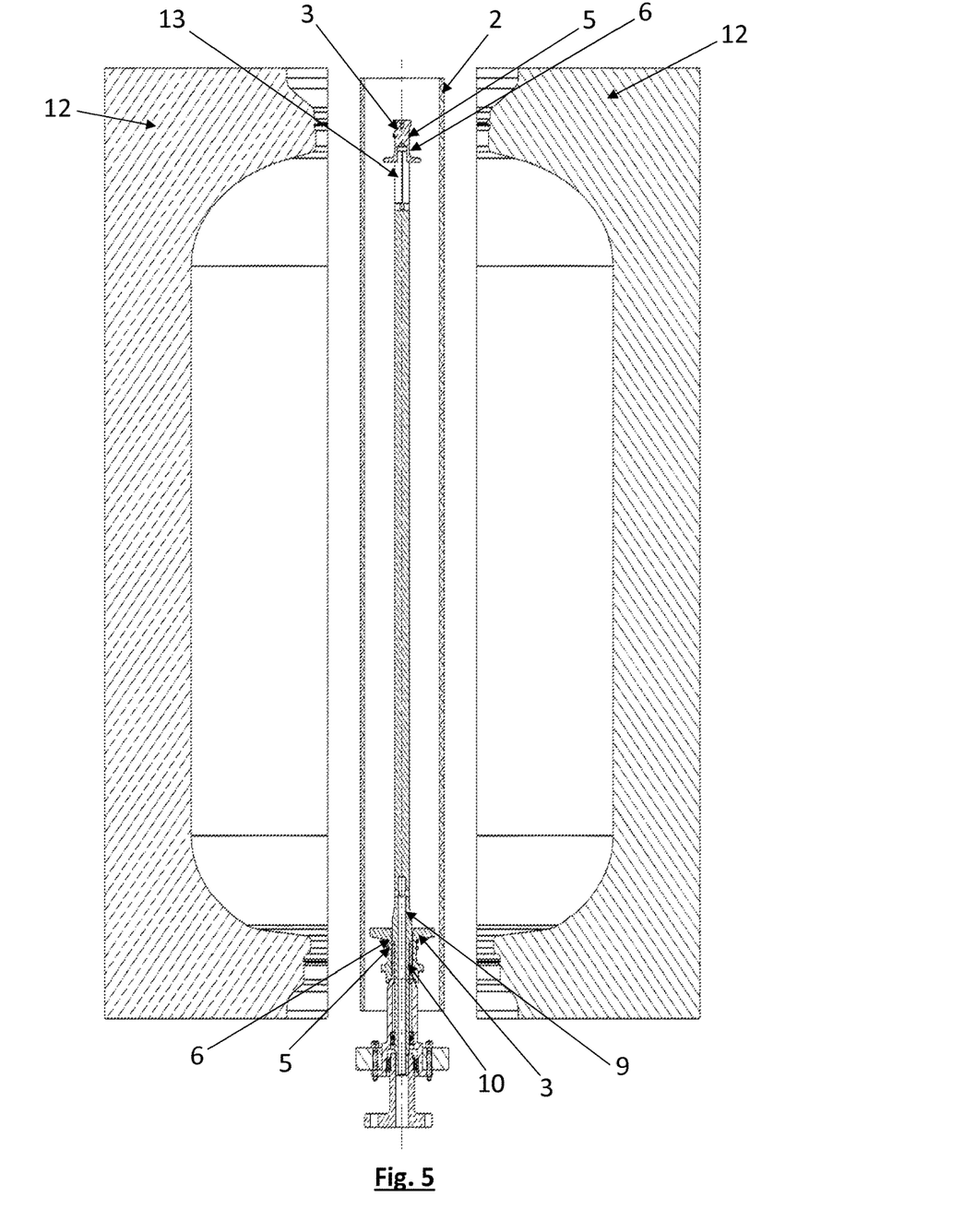
FIG. 5 illustrates a sectional representation of a tool, in accordance with embodiments.

As illustrated in FIG. 5, in accordance with embodiments, a tool is provided in its entirety. The tool comprises an injector 9 to inject a fluid such as compressed air, and two mold halves 12. The injector 9 has in the lower region thereof an adapter 10 as the receptacle for a metal part 3, namely the valve receptacle, and at the end of the injector 9 a clamping piece 13 as the receptacle for a further metal part, namely an end piece. The metal parts 3 may be inserted on the injector 9 into a tubular extruded preform 2, between the two mold halves 12. The injector 9 and the mold halves 12 are configured such that, by closure of the mold halves 12 and by subsequent blow molding by way of injection of air through the injector 9, through the open axial bore of the injector 9, represented right at the bottom, in addition to the general shaping of the inner container 1, at each end a collar 4, which comprises the respective metal part 3 and is gas-tight with respect to the respective metal part 3, is formed on the preform 2.

Figure 6:
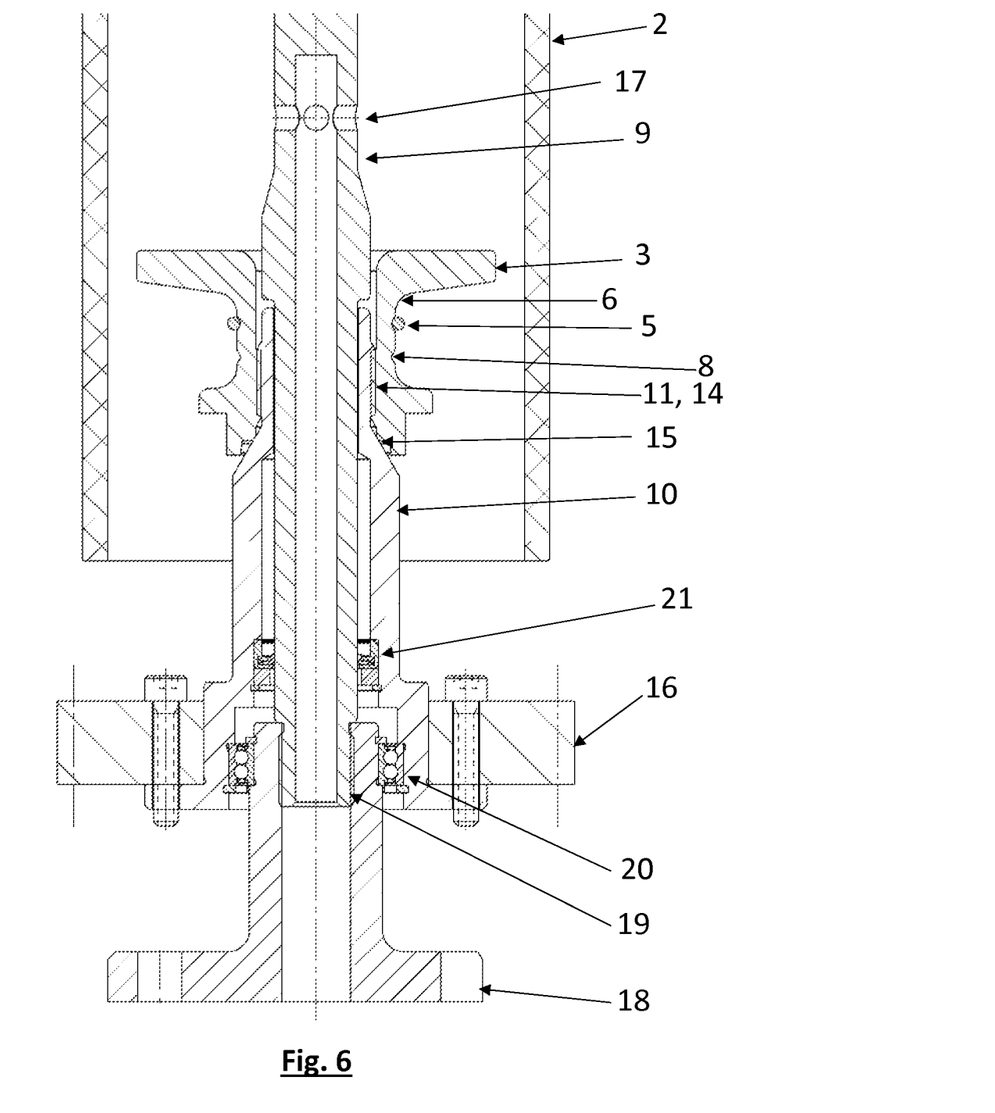
FIG. 6 illustrates a detailed representation of the receiving region of the metal part (valve receptacle) represented at the bottom of FIG. 5.

As illustrated in FIG. 6, a detailed view of the adapter 10 is provided with greater accuracy. The adapter 10 is arranged rotatably about the injector 9. The adapter 10 has at its upper end an external thread 14, on which the metal part 3 (valve fitting) is screwed by way of its internal thread 11. The metal part 3 seals itself, on the one hand, in the thread 11,14, and on the other hand, on a cone as the contact portion 15 of the adapter, which has metal-to-metal contact to the valve receptacle 3. The adapter 10 may be set in rotation via a gearwheel or a toothed belt pulley as the drive 16. Onto the metal part 3 applied to the adapter 10 is placed an O-ring as the sealing element 5, optionally also an adhesive and sealing compound 6. The compressed air fed into the injector 9 may make its way via outlets 17 out of the injector 9 into the interior of the preform 2, so as to press the latter against the mold halves 12. At the lower end of the injector 9, this is fixedly connected to a vertical slide 18 via a tight screw connection 19. On the vertical slide 18, the adapter 10 is also rotatably mounted via a bearing 20. Between the injector 9 and the adapter 10 is arranged a high-pressure shaft seal 21.

Figures 7, 8:
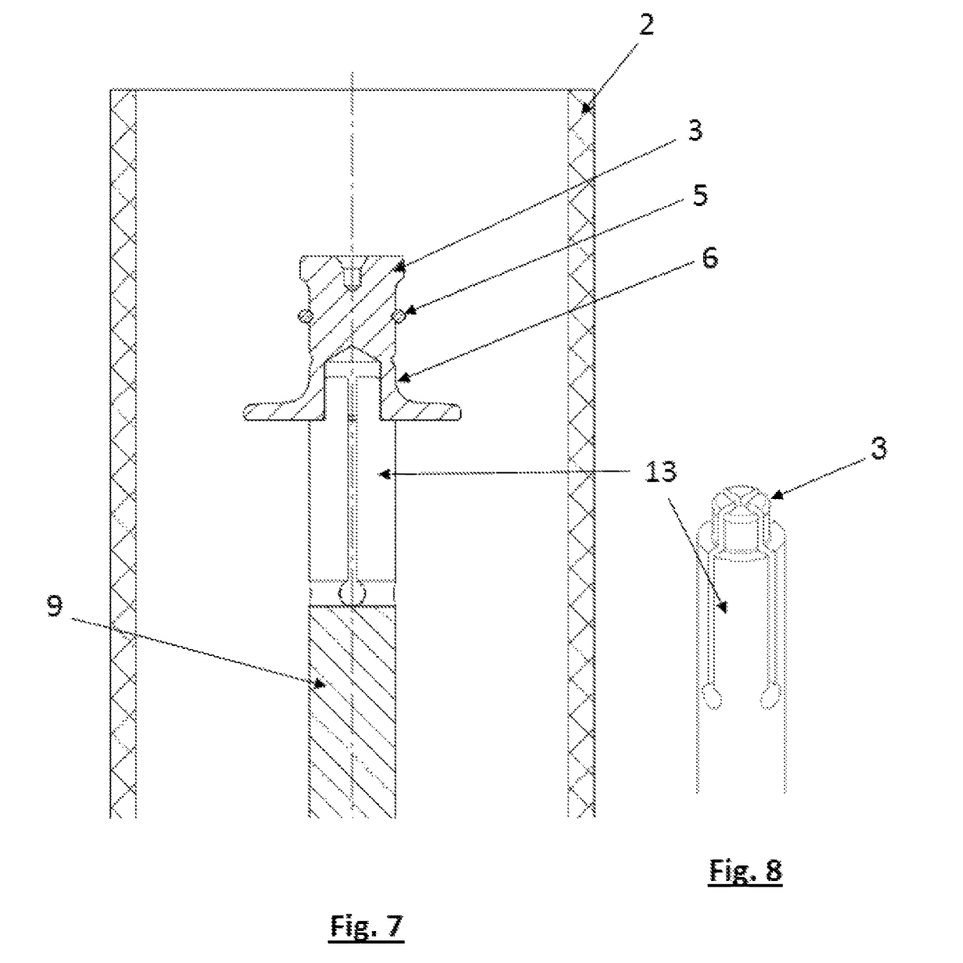
FIG. 7 illustrates a detailed representation of the receiving region of the metal part (end piece) represented at the top of FIG. 5.
FIG. 8 illustrates a three-dimensional representation of the clamping piece of FIG. 7.

As illustrated in FIG. 7, the receiving region of the metal part 3 represented at the top of FIG. 5, namely, the region in which an end piece 3 may be mounted onto a clamping piece 13 of the injector 9.

As illustrated in FIG. 8, the clamping piece 13, which at its end forms a quartered bead with over measure, so that a metal part 3 may be mounted onto the end.

In a method of production in accordance with embodiments, following application of the metal parts 3 to the injector 9, firstly a machine slide, on which the injector 9 is seated, is moved up and the injector 9 is guided into the preform 2. Following closure of the mold halves 12, the compressed air is blown in through the injector 9 and the outlets 17 and the inner container 1 is hereby molded. The mold halves 12 squeeze the tube 2 onto the metal parts 3 and hereupon compress the O-rings 5. As a result, the seal is created between the liner 1 and the metal parts 3.

Following the blowing, the mold halves 12 are moved apart, the adapter 10 is rotated by way of a gear or belt drive 16 and thereby unscrewed from the nipple of the valve receptacle 3. When the adapter 10 is unscrewed at the bottom from the valve receptacle 3, the inner container 1 is hereupon lifted with the end piece 3 at the top from the injector 9. The gear or belt drive 16 therefore simultaneously effects the lifting of the inner container 1 from the upper clamping piece 13. The slide 18 may now be moved downwards and the inner container 1 may be removed from the injector 9.

Figure 9:
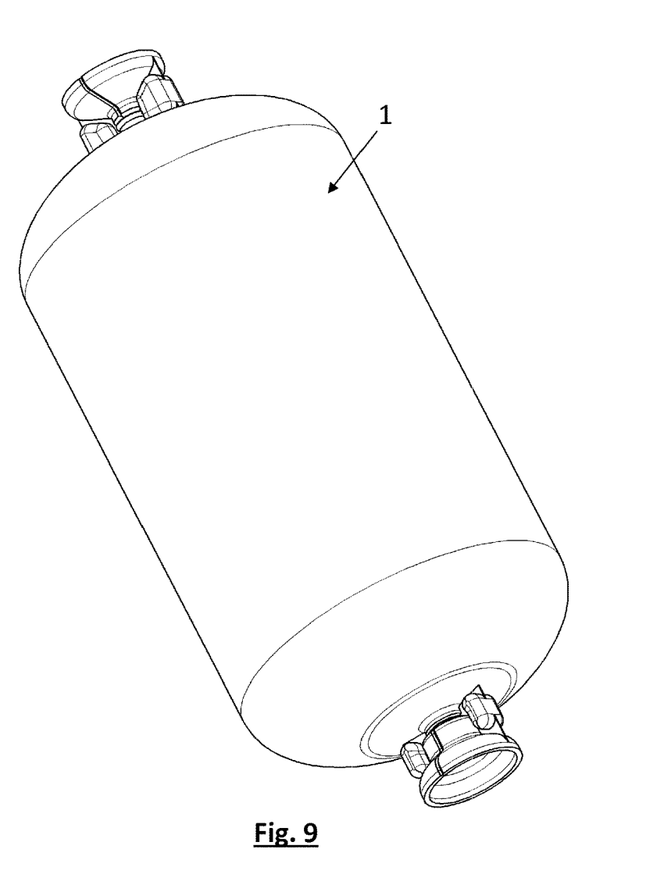
FIG. 9 illustrates a perspective view of an inner container of a pressure vessel, showing a method of producing a pressure vessel.

As illustrated in FIG. 9, an inner container 1 is provided during production, and the manner of removing the liner 1 from the mold halves 12 after the blow molding, with excess material on the end caps.

Figure 10:
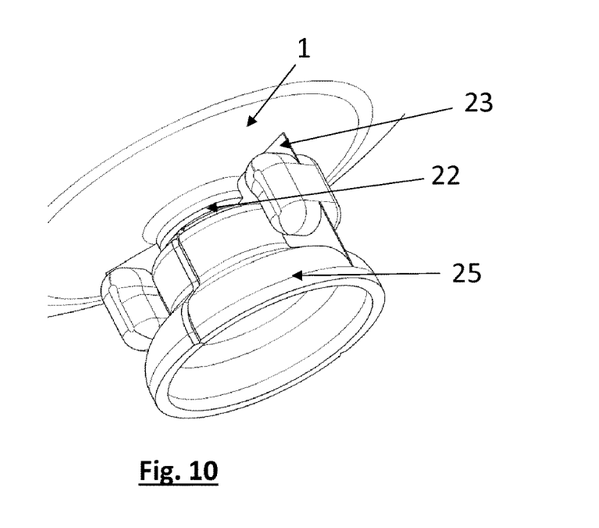
FIG. 10 illustrates a detailed representation of the end region represented at the bottom of FIG. 9.
Figure 11:
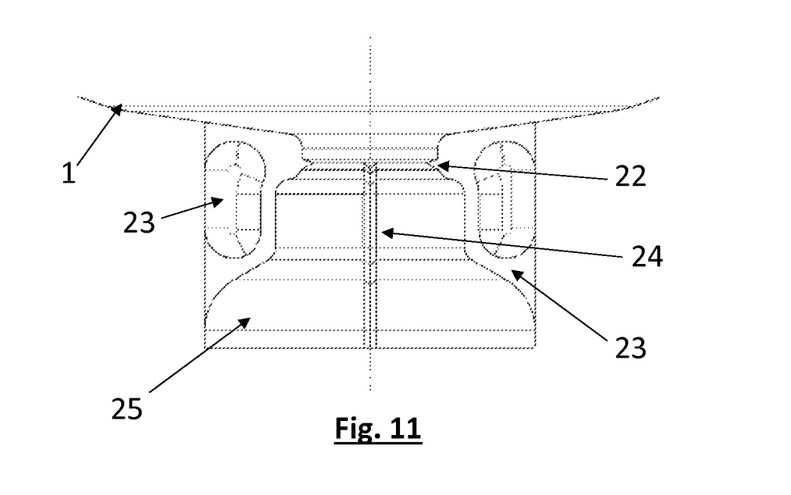
FIG. 11 illustrates a sectional view of the end region of FIG. 10.

As illustrated in FIGS. 10 and 11, the end region represented at the bottom of FIG. 9, and a sectional view of the end region. An indentation 22 formed in the blow molding axially outside the useful region of the inner container 1 facilitates the removal of the waste 25. A material discharge 23 of the material of the preform 2 between the mold halves 12 (flash) is only a few tenths of a millimeter thick. The flash may be removed without difficulty. A notch 24, likewise formed in the blow molding, enables the waste 25 to be broken into parts.

Figure 12:
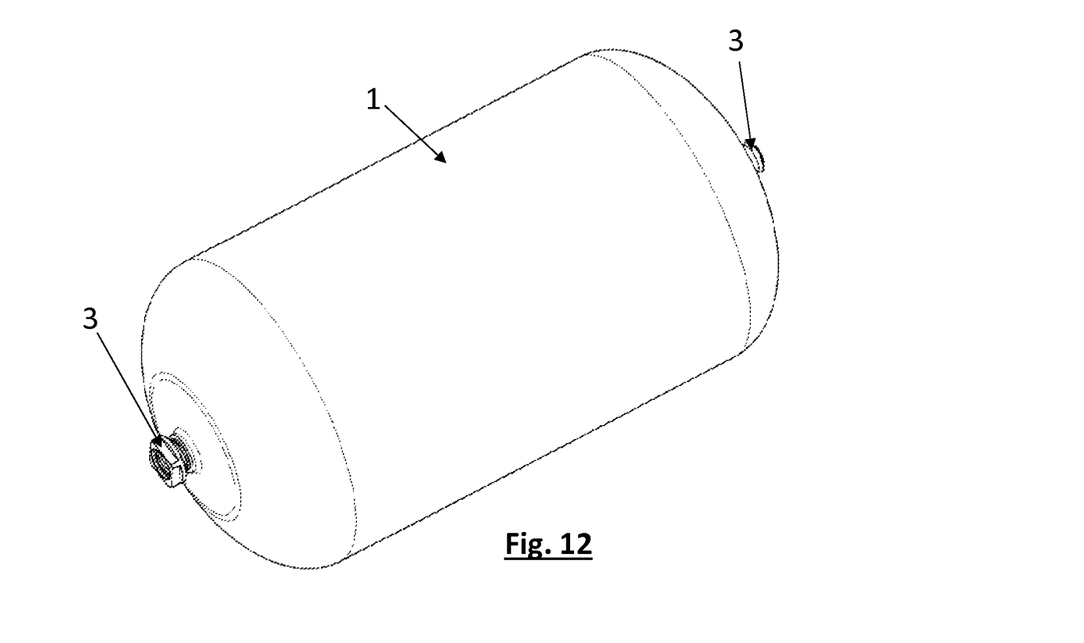
FIG. 12 illustrates a perspective view of an inner container of a pressure vessel, in accordance with embodiments.

As illustrated in FIG. 12, an inner container 1 of a pressure vessel in accordance with embodiments with embedded metal parts 3, following the removal of the waste 25.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS 1 inner container
2 preform
3 metal part
4 collar
5 sealing element
6 sealing compound
7 non-rotationally symmetric mold
8 molding
9 injector
10 adapter
11 internal thread
12 mold half
13 clamping piece
14 external thread
15 contact portion
16 drive
17 outlet
18 vertical slide
19 screw connection
20 bearing
21 high-pressure shaft seal 22 indentation
23 material discharge
24 notch
25 waste

What is claimed is:

1. A method for producing a pressure vessel comprising an inner container made of thermoplastic plastic, the method comprising:
   blow-molding the inner container from a preform in a tool; and
   embedding, during the blow molding, at least one metal part in the inner container,
   wherein the blow molding of the inner container includes forming a collar on the inner container so as to be gas-tight with respect to the at least one metal part, the collar including the at least one metal part.

2. The method of claim 1, wherein the blow molding of the inner container includes sealing the collar from the at least one metal part by a flexible sealing element.

3. The method of claim 1, wherein the inner container, at the collar, is axially separated outside a seal against the at least one metal part.

4. The method of claim 1, wherein the at least one metal part comprises a valve receptacle.

5. The method of claim 1, wherein the at least one metal part has a non-rotationally symmetric shape, so that as a result of being embedded in the inner container, the at least one metal part serves as a positive-locking anti-twist device.

6. The method of claim 1, wherein the at least one metal part has moldings so that positive-locking axial displacement protection is provided.

7. The method of claim 1, wherein, before the blowing molding of the inner container, the at least one metal part is fitted on an injector for the injection of a gas.

8. The method of claim 7, wherein the at least one metal part is fitted onto an adapter which is rotatable and axially fixed on the injector.

9. A method for producing a pressure vessel comprising an inner container made of thermoplastic plastic, the method comprising:
   blow-molding the inner container; and
   embedding at least one metal part in the inner container,
   wherein the blow molding of the inner container includes forming a collar on the inner container to be gas-tight with respect to the at least one metal part.

10. A method for producing a pressure vessel comprising an inner container made of thermoplastic plastic, the method comprising:
    blow-molding the inner container; and
    embedding, during the blow molding, at least one metal part in the inner container,
    wherein the blow molding of the inner container includes forming a collar on the inner container, the collar including the at least one metal part.

* * * * *